US008612889B2

(12) United States Patent
Ookuma

(10) Patent No.: US 8,612,889 B2
(45) Date of Patent: Dec. 17, 2013

(54) INFORMATION PROCESSING DEVICE, METHOD FOR CONTROLLING SCREEN DISPLAY AND STORAGE MEDIUM

(75) Inventor: Satoshi Ookuma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 13/292,905

(22) Filed: Nov. 9, 2011

(65) Prior Publication Data

US 2012/0124522 A1 May 17, 2012

(30) Foreign Application Priority Data

Nov. 11, 2010 (JP) ................................. 2010-253200

(51) Int. Cl.
*G06F 3/048* (2013.01)

(52) U.S. Cl.
USPC ......................................... 715/810; 715/840

(58) Field of Classification Search
USPC .......................................... 715/840, 810, 835
See application file for complete search history.

(56) References Cited

U.S. PATENT DOCUMENTS

| 6,700,959 | B2 * | 3/2004 | Kotsuki ................... 379/100.01 |
| 2008/0270911 | A1 * | 10/2008 | Dantwala et al. ............. 715/741 |
| 2012/0030585 | A1 * | 2/2012 | Akuzawa ...................... 715/747 |

FOREIGN PATENT DOCUMENTS

| JP | 2007-128370 A | 5/2007 |
| JP | 2008-158695 A | 7/2008 |

* cited by examiner

*Primary Examiner* — Omar Abdul-Ali

(74) *Attorney, Agent, or Firm* — Canon U.S.A., Inc., IP Division

(57) ABSTRACT

A web application makes a registration request of a web top button to a web browser. The web application designates the title to be displayed on the button, the access URL to the web application, and the position of the icon which the web application has. The web browser makes the button registration request to a window manager in response to the button registration request. The title to be displayed on the button and the position of the icon which the web application has are designated. The window manager registers the button in response to the request and displays the button together with the icon.

4 Claims, 11 Drawing Sheets

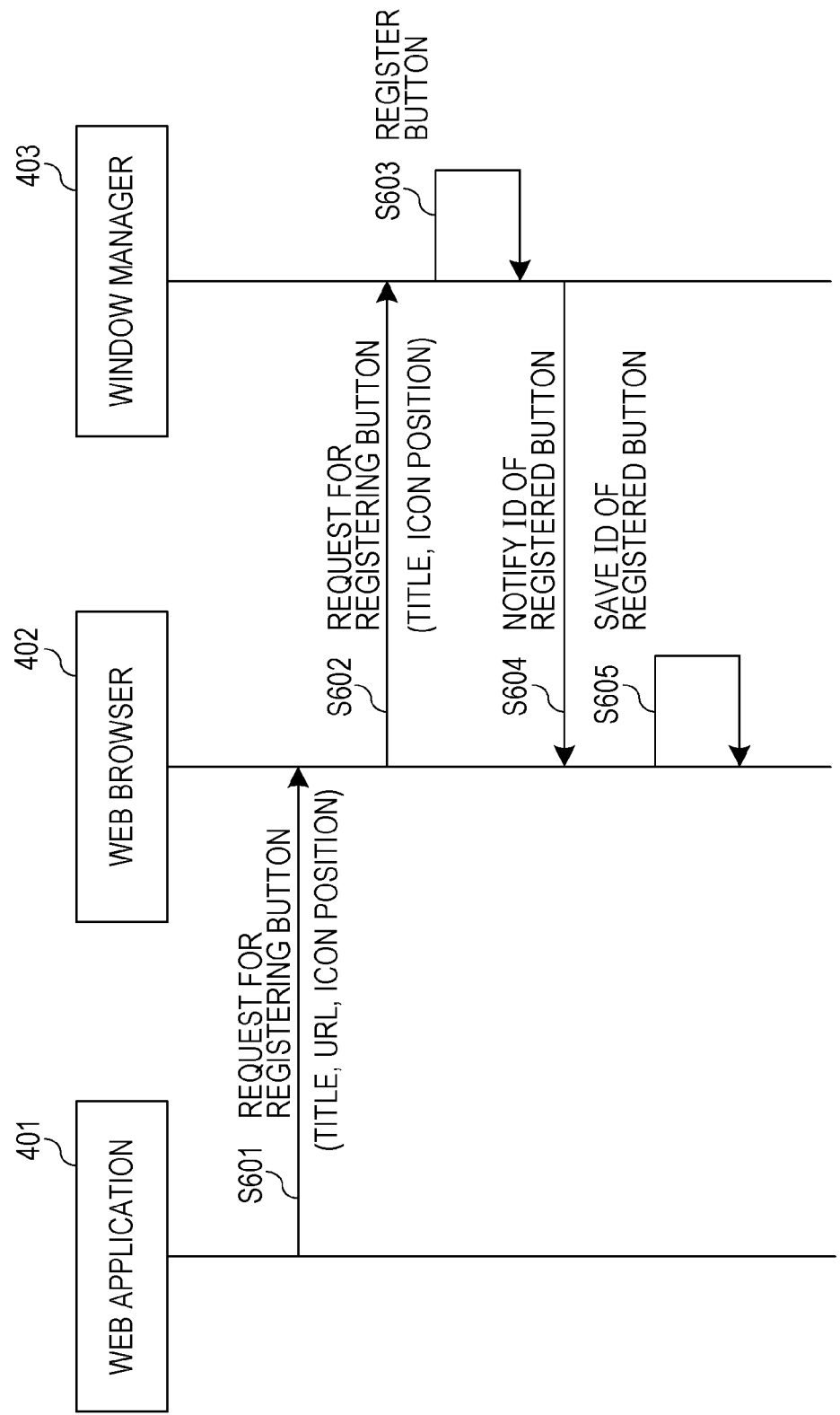

INFORMATION PROCESSING DEVICE, METHOD FOR CONTROLLING SCREEN DISPLAY AND STORAGE MEDIUM

BACKGROUND OF THE INVENTION

1. Field of the Invention

The present invention relates to an information processing device, a method for controlling screen display and a storage medium. More specifically, the present invention is suitable to display a button for selection of application and an icon corresponding to the button.

2. Description of the Related Art

It has been known to connect an information processing device (i.e. a device), such as a multi functional peripheral (MFP), to an external server on a network and use a service (i.e., an application) provided by the external server in the MFP. It is also known, according to the Japanese Patent Laid-Open No. 2007-128370, to transmit image data, which is read from an original document and is generated, to a documentation management server on a network and to register the image data in a documentation management database on the side of the documentation management server. It is also known to connect to an external server using a web browser when an external service is used in an information processing device.

It is also known, according to Japanese Patent Laid-Open No. 2008-158695, to provide a web server (i.e., an application) inside an information processing device, to create screen content by synthesizing information using a function of an external server and information inside the device, and to let the screen content be displayed on a web browser. The web server inside this information processing device (i.e., an internal web server) displays an operation screen for using the service of the external server by the built-in web browser in the information processing device and receives user instruction. The internal web server of this information processing device provides different URL addresses for each external service to be used.

Some of these information processing devices provided with such an internal web server are capable of registering a shortcut button (i.e., a web top button) of the web browser to which the URL address of the internal web server is associated. When the web top button is selected, a web browser is displayed on the operation screen. The web browser accesses the internal web server in the URL registered in the web top button and displays that web screen content.

Usually, an icon is displayed on the web top button. Since the web top button is registered as a shortcut of the web browser, the icon of the web browser is usually displayed. Even if the internal web server provides different URLs by multiple external services and different URL addresses thereof are registered in the multiple web top buttons, the same icon of the web browser is displayed for all the web browsers. Since the web top button is the shortcut of the web browser, even if different URL addresses are registered, the icon of the web browser is resultantly displayed on the operation screen as the selected application. Therefore, in the information processing device, all the web top buttons are treated as shortcut buttons to the web browsers. Thus, the same icon is displayed on the web top buttons as the icon of the web browser. In information processing devices, such as personal computers (PCs), an icon acquired from the web server may be displayed on the web top button. In this case, since the icon displayed on the web top button is acquired for each web server, even if multiple web top buttons are displayed, the icons displayed on these multiple web top buttons differ for each application. Therefore, a user can identify the icons easily.

SUMMARY OF THE INVENTION

An information processing device of the present invention includes a web browser which displays content information, an application which communicates with the web browser and with an external device, and receives content information from the external device, a button selected by user to let the web browser request to the application and display a screen of the content information, a window manager which controls display of an icon which is in accordance with the application and which lets the user to identify the button, wherein: the application includes a management unit which manages the icon which is in accordance with the application and which is transmitted to the web browser to be displayed by the window manager, the web browser includes a storage unit which lets the information about the application and the information about the button for selecting that application in a storage medium be stored in a storage medium in a correlated manner when a request for registration of the button for selecting that application is made by that application, and the window manager includes a display unit which displays, in a correlated manner, information about the button for selection of the application which is stored by the storage unit and an icon which is managed by the management unit and is in accordance with the application.

Further features according to the present invention will become apparent from the following description of exemplary embodiments with reference to the attached drawings.

BRIEF DESCRIPTION OF THE DRAWINGS

FIG. 6 is a timing chart illustrating a first example of a process of the print system.

DESCRIPTION OF THE EMBODIMENTS

The present invention provides display of an icon in accordance with an application inside an information processing device, such as an MFP.

Hereinafter, embodiments of the present invention will be described with reference to the drawings. The embodiments described below are not restrictive for the invention related claims and the combinations of features described in each embodiment are not always necessary to solve the problems of the present invention.

Figure 1:
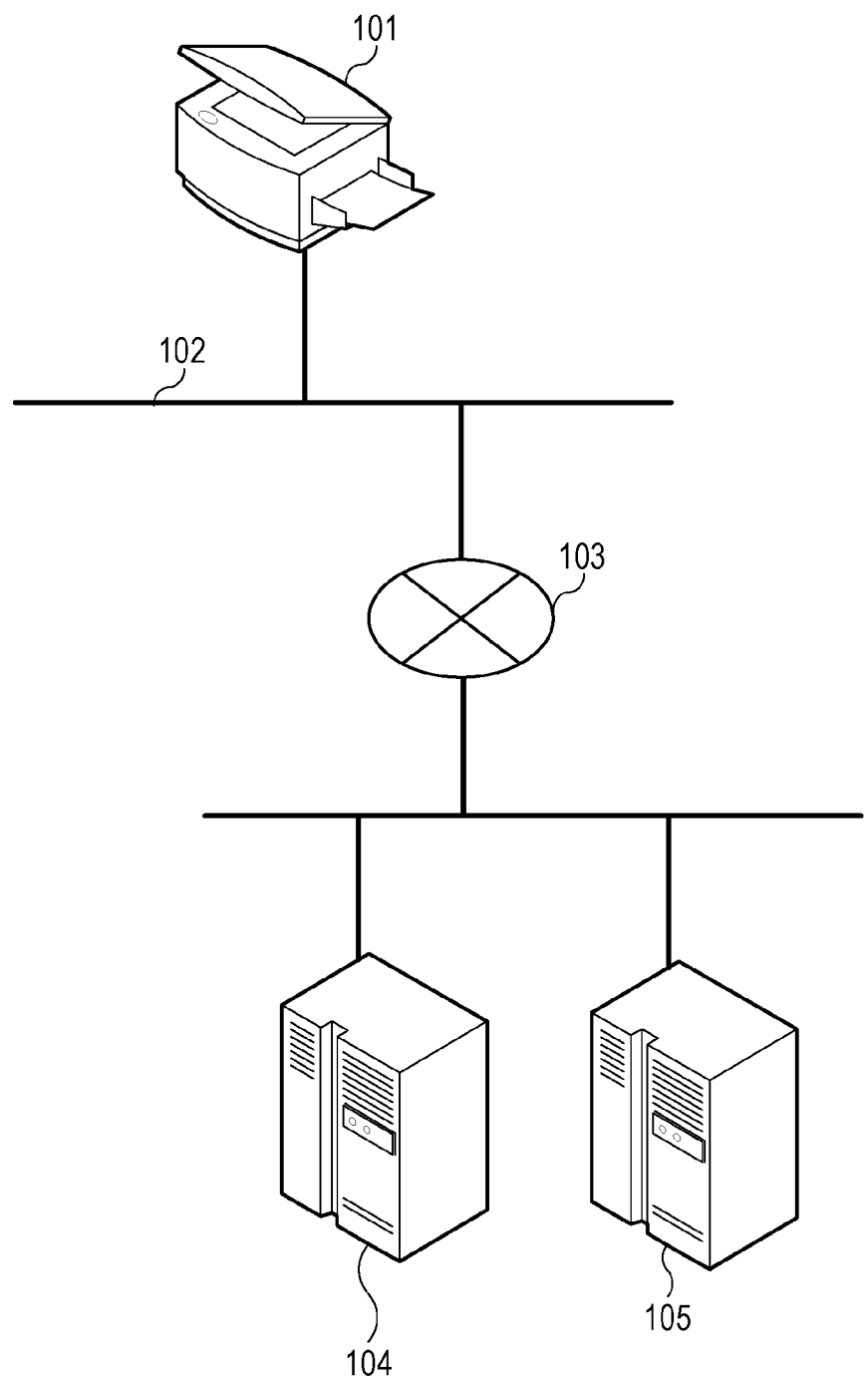
FIG. 1 illustrates the entire configuration of a print system.

A first exemplary embodiment of the present invention will now be described. FIG. 1 illustrates an example of the entire configuration of a print system. In this print system, an MFP 101 which is an example of an information processing device is connected to external servers 104 and 105 which are examples of external devices via a network constituted by a local area network (LAN) 102 and the Internet 103.

The MFP 101 has a copying function in which a paper medium is scanned, an image in accordance with the scanned data is formed on a paper sheet and the image is printed on a paper sheet. The external server 104 which provides a file management service described below is connected to the Internet 103 via the LAN 102. Similarly, the external server 105 which provides a file management service which is different from that of the external server 104 is connected to the Internet 103 via the LAN 102. With this configuration, the MFP 101 is capable of communicating with the external server 104 and the external server 105 and using the file management services provided by the external servers 104 and 105.

Here, an example in which only the external server 104 provides the file management service will be described. As another configuration of the external server 104, the external server 104 starts multiple virtual machines among a server group constituted by multiple servers and lets the multiple virtual machines perform processes for the file management service in a distributed manner. In this case, a scale-out technique (i.e., cloud computing) which increases the number of the virtual machines under predetermined conditions is used. These configurations are similarly applied to the external server 105.

Figure 2:
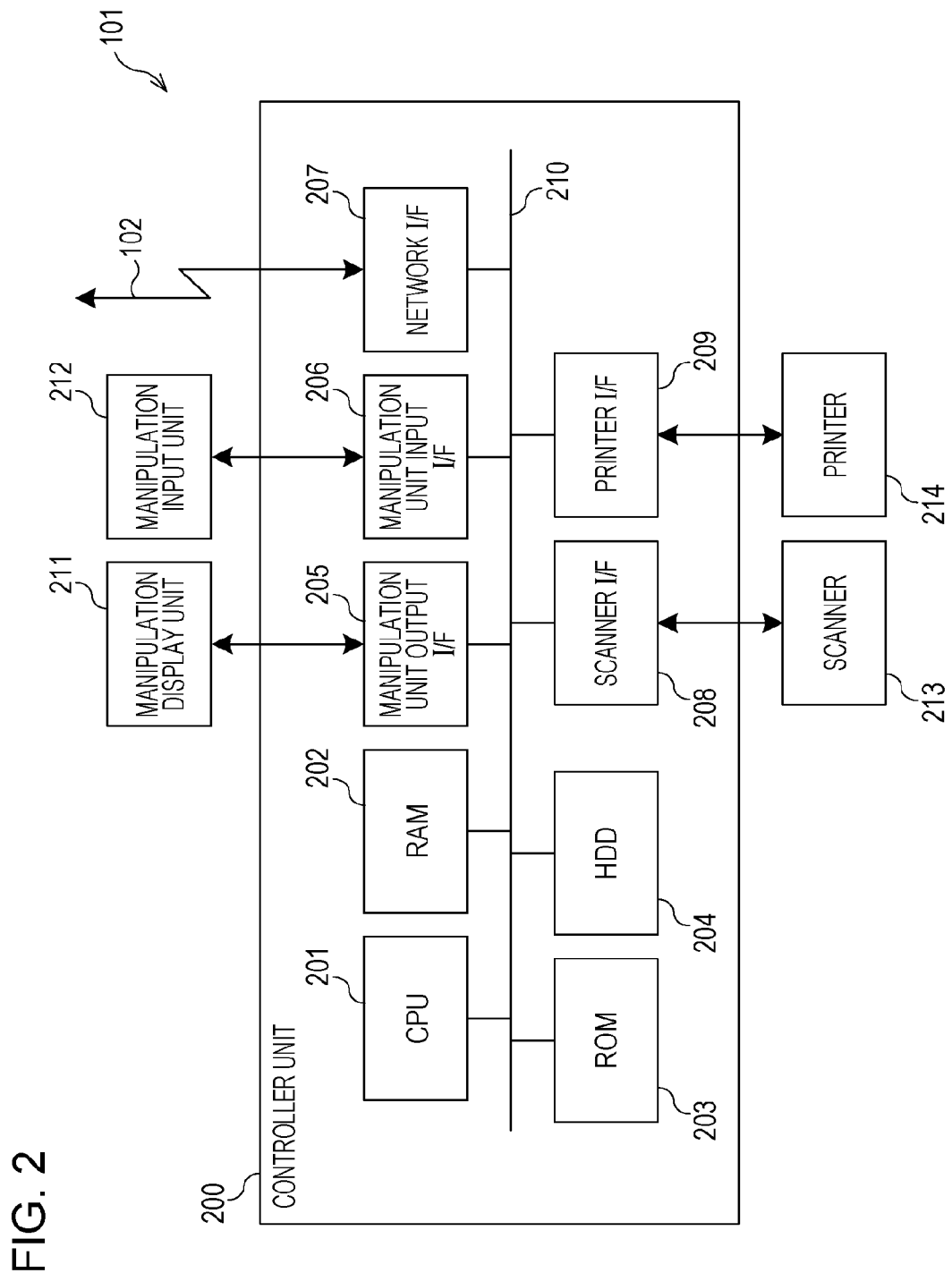
FIG. 2 illustrates a configuration of an MFP.

FIG. 2 illustrates an example of the configuration of the MFP 101. The MFP 101 is provided with a controller unit 200. The controller unit 200 can establish mutual connections with a scanner 213 and a printer 214, and also with a manipulation display unit 211, a manipulation input unit 212 and a LAN 102. The controller unit 200 is provided with a central processing unit (CPU) 201 which executes various control programs. The CPU 201 starts a system in accordance with a boot program stored in read only memory (ROM) 203. The CPU 201 reads a control program stored in, for example, a hard disk drive unit (HDD) 204 on this system and performs a predetermined process on random access memory (RAM) 202 as a work area.

Various control programs (e.g., programs for screen display control described below) including a function of a web browser 402 described below are stored in the HDD 204. Scanned data read from the scanner 213 and data acquired from outside of the MFP 101 via a network I/F 207 are stored in the HDD 204. A manipulation unit output I/F 205 controls communication for the output of data to the manipulation display unit 211. A manipulation unit input I/F 206 controls communication for the input of data from the manipulation input unit 212. The network I/F 207 is connected to the LAN 102 and controls input and output of information via the LAN 102. The scanner I/F 208 receives image data from the scanner 213 and inputs and outputs scanner control data. The printer I/F 209 outputs the image data to the printer 214 and inputs and outputs printer control data. The devices 201 to 209 are arranged on a system bus 210.

The manipulation input unit 212 is an interface provided with an input device, such as a touch panel and a hard key, on which a user inputs instructions. The manipulation display unit 211 is a display interface to the user and is provided with display devices, such as a liquid crystal display (LCD) and a light emitting diode (LED). The scanner 213 is provided with an optical reader, such as a charge coupled device (CCD), which has a function to optically manipulates a paper medium and read data as electronic image data. The printer 214 has a function to render the electronic image data as an image on a recording medium, such as a paper sheet.

Figure 3:
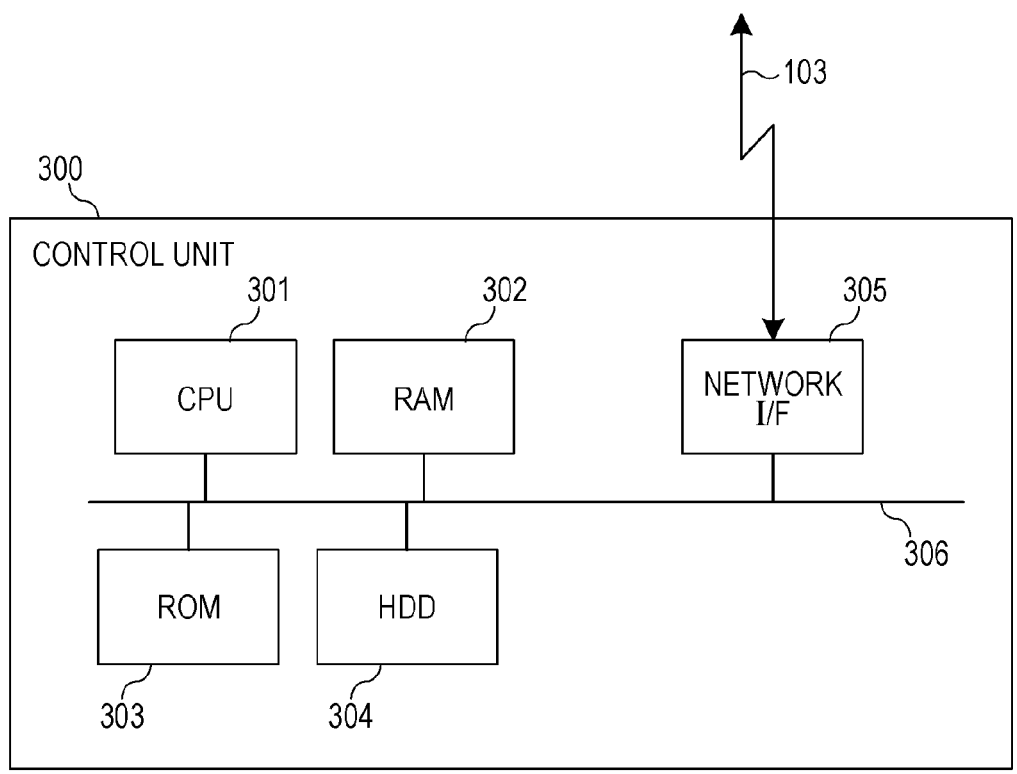
FIG. 3 illustrates a configuration of an external server.

FIG. 3 illustrates an example of a configuration of the external server 104. Note that the external server 105 is the same in configuration with the external server 104, thus a detailed description of the external server 105 will be omitted. The external server 104 is provided with a control unit 300 which can access the Internet 103. The control unit 300 is provided with a CPU 301 which executes various control programs, and controls the entire operation of the external server 104. The CPU 301 reads the control program stored in the ROM 303 or in the HDD 304 and executes predetermined processes on the RAM 302 as a work area.

Figure 4:
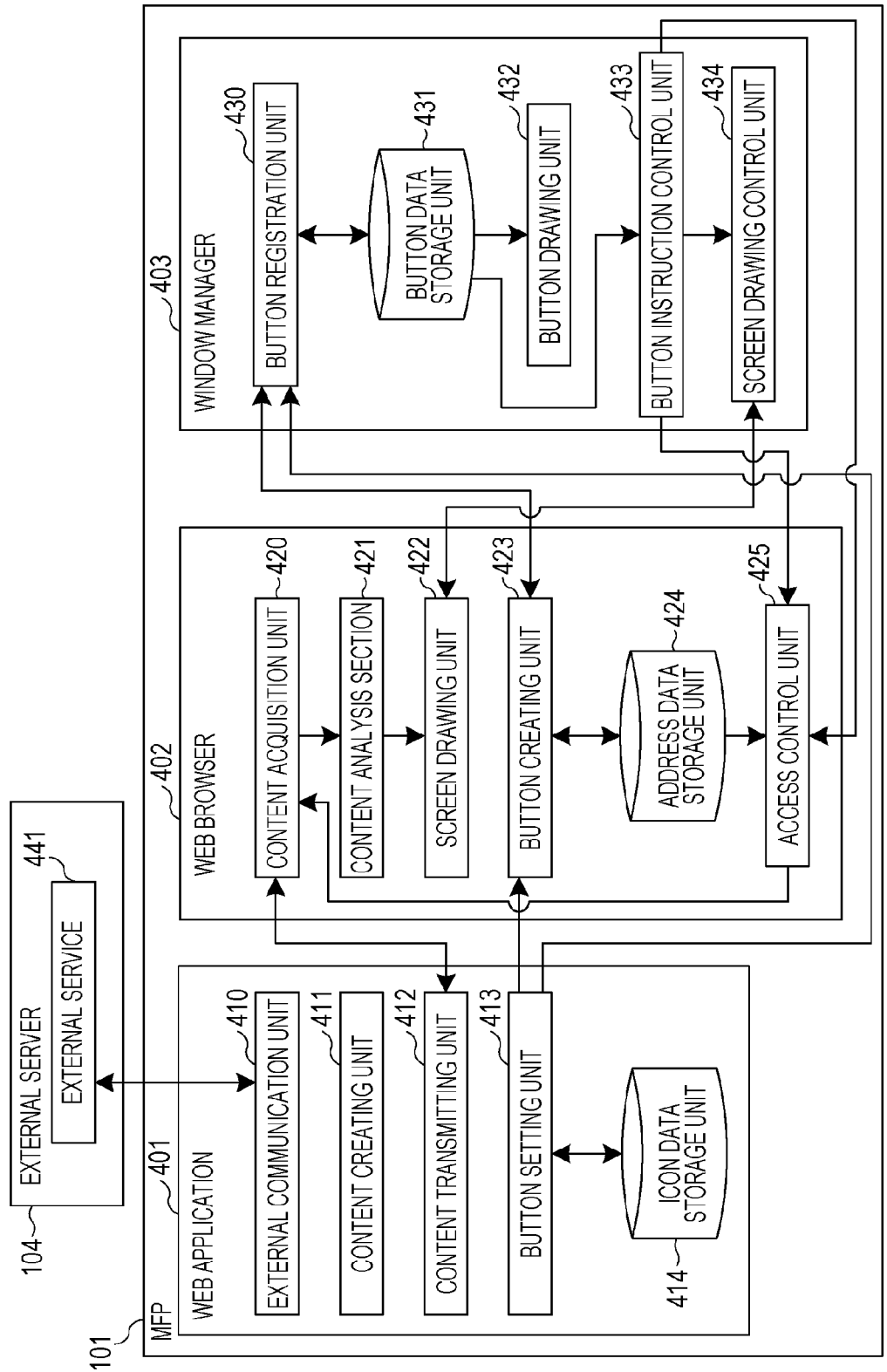
FIG. 4 illustrates a configuration of software of the entire print system.

Various control programs including a function of an external service 441 illustrated in FIG. 4 are stored in the HDD 304. File management data necessary for the implementation of the function of the external service 441 is stored in the HDD 304. A network I/F 305 performs input-output control of information via the Internet 103. The devices 301 to 305 described above are arranged on a system bus 306.

FIG. 4 illustrates an example of a software configuration of the entire print system. A function unit which the MFP 101 has among the function units illustrated in FIG. 4 is implemented by the CPU 201 in the MFP 101 reading and executing control programs stored in the ROM 203 or in the HDD 204. A function unit which external server 104 has is implemented by the CPU 301 of the external server 104 reading and executing control programs stored in the ROM 303 or in the HDD 304. The MFP 101 has functions of a web application 401, a web browser 402 and a window manager 403.

The web application 401 communicates with the external server 104, controls the device using the service provided by the external server 104 (i.e., the file management service) and provides the web browser 402 with a manipulation display screen. The web application 401 is capable of installing multiple applications from outside the MFP 101 or deleting the same. Note that the web application 401 in the external server 104 is described as an example, but the web application in the external server 105 performs similar processes to those the web application 401 in the external server 104 does. For this reason, a detailed description of the web application in the external server 105 will be omitted.

The web application 401 is provided with an external communication unit 410, a content creation unit 411, a content transmitting unit 412 and a button setting unit 413. The external communication unit 410 communicates with the external server 104 to use the service of the external service 441. In particular, the external communication unit 410 transmits a request message to the external service 441 and receives a response message from the external service 441.

The content creation unit 411 analyzes the response message received from the external communication unit 410 and creates operation screen content (i.e., web content) to be transmitted to the web browser 402. The content transmitting unit 412 transmits the operation screen content created by the content creation unit 411 in response to a request from the web browser 402. The button setting unit 413 requests the web browser 402 to create a button of the web application 401 which includes the button setting unit 413 in order to let the web application 401 be displayed on an operation screen of the MFP 101 (i.e., the manipulation display unit 211). At the same time, the button setting unit 413 transmits, to the web browser 402, icon data of an icon data storage unit 414 which the web application 401 to which the button setting unit 413 belongs has or the position at which the icon data is stored. The icon data storage unit 414 is stored in the RAM 202 or in the HDD 204. The button setting unit 413 manages the icon (i.e., the icon data) using the icon data storage unit 414.

The web application 401 requests, to the window manager 403 via the web browser 402, registration of a button to be displayed on an operation screen in order to display the operation screen by the web browser 402. In response to the user's instruction input via the manipulation input unit 212, the web browser 402 transmits a request for the operation screen content to the web application 401, acquires the operation screen content from the web application 401, and displays the acquired operation screen content on the manipulation display unit 211. The web browser 402 is provided with a content acquisition unit 420, a content analysis section 421, a screen drawing unit 422, a button creation unit 423 and an access control unit 425.

The content acquisition unit 420 transmits a request to the content transmitting unit 412 of the web application 401 for acquisition of the operation screen content. The content acquisition unit 420 then receives the operation screen content transmitted from the content transmitting unit 412 as a response to the request. The content analysis section 421 analyzes the operation screen content acquired by the content acquisition unit 420 and creates a screen (i.e., image data) to be displayed on the manipulation display unit 211. The screen drawing unit 422 displays the screen created by the content analysis section 421 on the manipulation display unit 211. The screen drawing unit 422 draws the screen with respect to the manipulation display unit 211 when a drawing instruction is issued by a screen drawing control unit 434 of the window manager 403.

In response to a request from the button setting unit 413 of web application 401, the button creation unit 423 requests, to the window manager 403, registration of the button of the web application 401. The button creation unit 423 receives an ID of the button registered by the window manager 403 from the window manager 403 and stores the ID in the address data storage unit 424 as address data in association with the web application 401. The address data storage unit 424 is stored in the RAM 202 or in the HDD 204. When the user selects the button registered by a button registration unit 430, the access control unit 425 receives the notification of that user selection from the window manager 403.

Upon reception of this notification, the access control unit 425 reads, from the address data storage unit 424, the web application 401 which is in association with the ID of the display button which is received at the time of notification. The access control unit 425 issues an instruction to make a request for the operation screen content to the content acquisition unit 420. The window manager 403 performs display and control of a button used for switching screens of the web browser 402 and other applications displayed on the manipulation display unit 211 or switching screens for each of the applications. The window manager 403 is provided with the button registration unit 430, a button drawing unit 432, a button instruction control unit 433 and a screen drawing control unit 434.

The button registration unit 430 receives a request from the button creation unit 423 and registers a button of the web application 401 which uses the web browser 402. Upon registration of the button, the button registration unit 430 issues an ID of the button and notifies the button creation unit 423 of the ID. The kind of the application and the ID of the button registered in the button are associated with each other and stored as button data in the button data storage unit 431. The button data storage unit 431 is stored in the RAM 202 or in the HDD 204.

The button drawing unit 432 draws, in accordance with the button data stored in the button data storage unit 431, the registered button on the button display screen which the window manager 403 displays. When the user's instruction input from the manipulation input unit 212 is an instruction to select the registered button, the button instruction control unit 433 notifies the application registered in the selected button of that user instruction. The button instruction control unit 433 is capable of identifying the application registered in the selected button from, for example, the button data stored in the button data storage unit 431. If the button that the user selected is the registration button of the web browser 402, the button instruction control unit 433 notifies the access control unit 425 of the ID of the selected registration button.

The screen drawing control unit 434 switches the screen to be displayed on the manipulation display unit 211 to the application registered in the button selected by the user in response to the instruction from the button instruction control unit 433. In particular, the screen drawing control unit 434 issues a drawing instruction to the application registered in the selected button. If the button which the user selected is the registration button of the web browser 402, the screen drawing control unit 434 issues a screen drawing instruction to the screen drawing unit 422. The external service 441 of the external server 104 receives a request message from the web application 401 and transmits a response message for providing the service which the external server 104, to which the external service 441 belongs, has to the web application 401. Similarly, the external service of the external server 105 receives a request message from the web application 401 and transmits a response message for providing the service which the external server 105, to which the external service belongs, has to the web application 401.

Figure 5A:
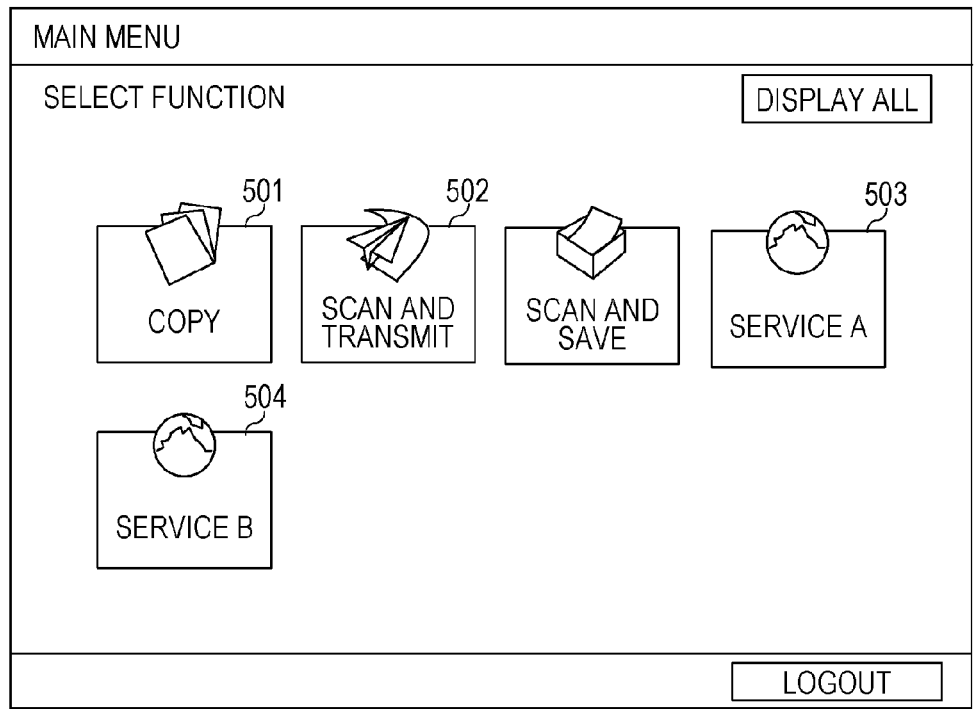
FIG. 5 illustrates an example of an operation screen.
Figure 5B:
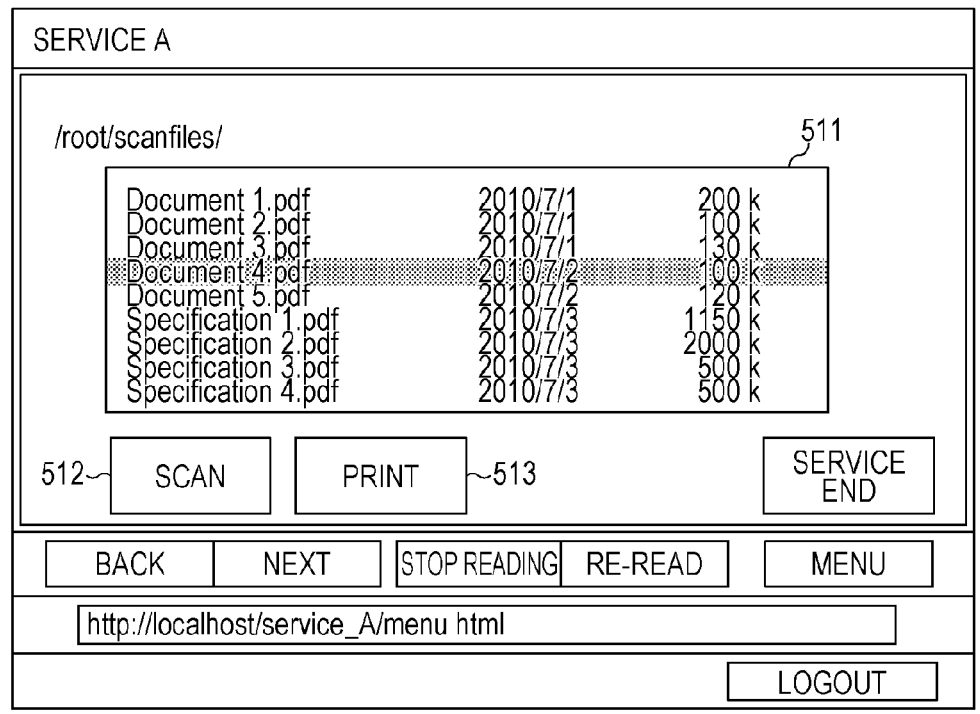

FIGS. 5A and 5B illustrates examples of the operation screen displayed on the manipulation display unit 211. These operation screens are created by the button drawing unit 432 of the window manager 403 or the screen drawing unit 422 of the web browser 402, and are displayed on the manipulation display unit 211 via the manipulation unit output I/F 205. The screen drawing control unit 434 switches the screens. FIG. 5A illustrates a display of a related art example of an application selection screen (i.e., a main menu screen) which the window manager 403 draws. With this application selection screen 500, functions of each of applications which are usable in the MFP 101 can be selected. A button 501 is pressed by the user when the user selects the application for a copy function in which a scanned original document is printed. A button 502 is pressed by the user when the user selects the application for a function in which a scanned original document is transmitted to other MFPs or servers via a network.

A button 503 is pressed by the user when the user selects the application using the external service 441 that the external server 104 provides. When the button 503 is selected, the window manager 403 switches the screen to the web browser 402. The web browser 402 acquires a screen from the web application 401, which is in association with the ID that the web browser 402 itself has stored in accordance with the ID of the button notified from the window manager 403.

FIG. 5B illustrates an example of a display screen of the file management application using the external service 441, which file management application is displayed when the button 503 of the application selection screen 500 is selected. A display screen 510 of the file management application is in accordance with a response that the web browser 402 acquired from the web application 401 upon request for a screen to the web application 401 that uses the external service 441. A list display unit 511 displays, as a list, files which are managed and held by the external service 441.

A scan button 512 is pressed by the user when the user issues an instruction to upload the scanned original document to the external service 441 as a file. A print button 513 is pressed by the user when the user issues an instruction to print a file selected by the user from among the file list displayed on the list display unit 511. The list display unit 511, the scan button 512, and the print button 513 are displayed on the web browser 402 as content, and an operation instruction is input via the web browser 402.

A button 504 illustrated in FIG. 5A is pressed by the user when the user selects an application using the external service that the external server 105 provides. When the button 504 is selected, a screen of the web browser 402 is displayed in the same manner as in the case of the display screen 510 of the file management application illustrated in FIG. 5B. An "operation screen of the service which the external service provides" created by the web application 401 is displayed on a content area on the screen of the web browser 402.

An icon representing the function which the application provides is displayed in each of the buttons 501 to 504 illustrated in FIG. 5A. Since the web application 401 communicates with the external service and the "operation screen of the service which the external service provides" is displayed on the web browser 402, the button 503 and the button 504 may be identified as buttons of the application of the web browser 402. For this reason, the icons displayed on the button 503 and the button 504 are the icon representing the web browser 402. That is, although the button 503 and the button 504 invoke different external services, the same icon of the web browser 402 is displayed. For this reason, it is not easy for the user to differentiate between buttons 503 and 504.

In the present embodiment, in a service in which the web browser 402 is used, the icon of the button on the screen on which the application is selected can be changed depending on the service provided when the corresponding button is pressed.

For ease of description, buttons with a mechanism in which the web browser 402 requests and displays a screen with respect to the web application 401 upon selection of those buttons, such as the button 503 and the button 504, will be referred to as web top buttons. FIG. 6 is a timing chart illustrating an example of a series of process steps in a print system at the time of changing icons of the web top buttons. Each operation of the timing chart illustrated in FIG. 6 is implemented, for example, by the CPU 201 of the MFP 101 executing a control program.

In step S601, the web application 401 makes a registration request for the web top button to the web browser 402. The button setting unit 413 of the web application 401 makes the registration request for this web top button to the button creation unit 423 of the web browser 402. At this time, the button setting unit 413 designates a title to be displayed on the button, an access URL to the web application 401 to which the button setting unit 413 belongs, and a position of the icon that the web application 401 to which the button setting unit 413 belongs has.

In step S602, the web browser 402 makes a button registration request to the window manager 403 in response to the button registration request in step S601. The button creation unit 423 notifies the button registration unit 430 of the window manager 403 of the title and the position of the icon received in step S601. In step S603, the button registration unit 430 of the window manager 403 registers the requested button. The button registration unit 430 creates an ID for identifying the registered button and stores, as button data, the type of the application for which the registration request has been made and icon position information in the button data storage unit 431 in a correlated manner. The button drawing unit 432 displays the registered button on the application selection screen (i.e., the main menu screen) together with the icon button.

Figure 7:
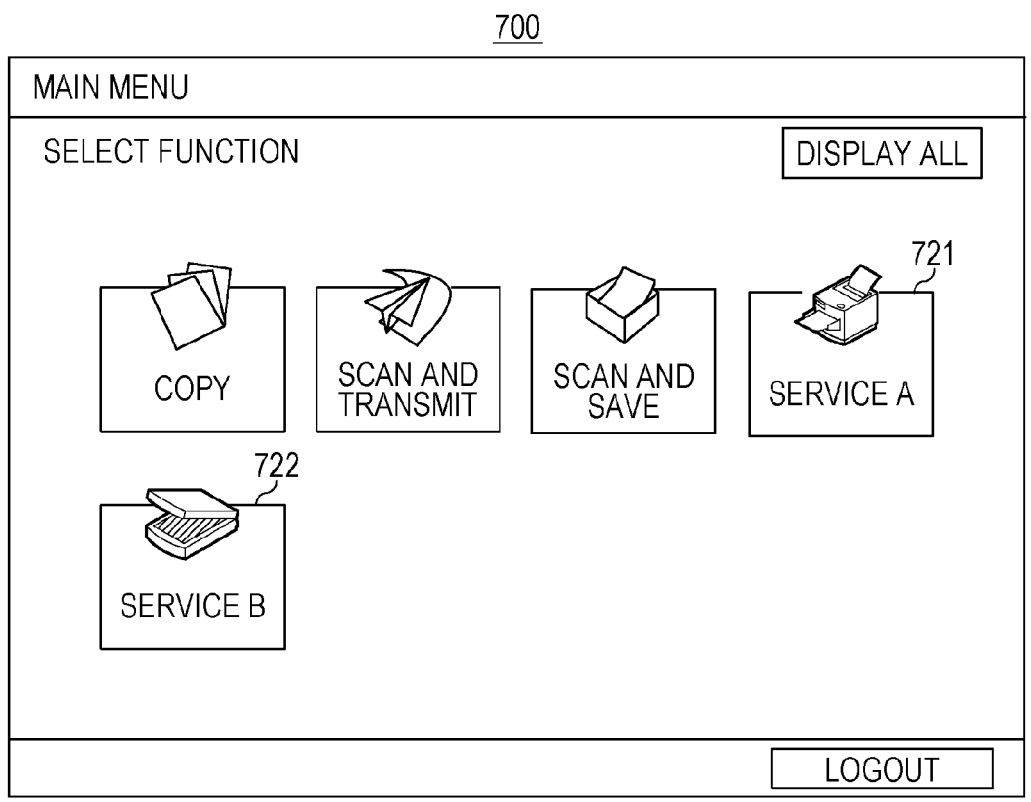
FIG. 7 illustrates a first example of an application selection screen.

FIG. 7 illustrates an example of an application selection screen (i.e., a main menu screen) after the completion of registration in step S603. Buttons 721 and 722 on an application selection screen 700 are web top buttons for displaying an application of the external service 441 of the external server 104 and an application of the external service of the external server 105, respectively. Icons of these web top buttons 721 and 722 have been changed to those designated by the web application 401. This allows the icons of the web top buttons 721 and 722 to change to those relevant to the services which provided by each of the applications and, as a result, this allows intuitive and easy-to-understand icons to be displayed to the user.

In step S604, the window manager 403 notifies the web browser 402 of an "ID for identifying button" created in step S603. In step S605, the web browser 402 performs subsequent processes. The web browser 402 stores the "ID for identifying button" received from the window manager 403 as address data in the address data storage unit 424 together with the access URL of the web application 401 requested in step S601. The web browser 402 accesses the application in accordance with the URL relevant to the button identification information for identifying the notified button.

As described above, in the present embodiment, the web application 401 makes the registration request of the web top button to the web browser 402. At this time, the web application 401 designates the title to be displayed on the button, the access URL to the web application 401 and the position of the icon which the web application 401 has. The web browser 402 makes the button registration request to the window manager 403 in response to the button registration request. At this time, the title to be displayed on the button and the position of the icon which the web application 401 has are designated. The window manager 403 registers the button in response to the request and displays the button together with the icon. This allows an icon in accordance with the web application 401 in the MFP 101 to be displayed together with the web top button. As a result, each of different icons which internal web applications 401 have designated can be displayed to each of multiple web top buttons and thus it is easy to differentiate among the web top buttons. This results in increased visibility and operability to the user. It is possible to change the icon of the web top button by the internal web application 401 at an arbitrary timing. With this, it is possible to notify the user of the state of the internal web application 401 before the user presses the web top button without the need of providing, for example, a dedicated display area or any manipulation for the acquisition of the state of the web application 401. This increases user convenience in the manipulation to the internal web application 401.

A second exemplary embodiment of the present invention will now be described. In the first embodiment, a case in which the position information about the icon is included in the registration instruction of the button from the web application 401 was described. In the present embodiment, the web browser 402 acquires position information about the icon that the web application 401 has by accessing the web application 401 upon receiving the registration instruction of the web top button from the web application 401. Thus, the present embodiment and the first embodiment differ from each other in the process to display the web top button and its icon.

Therefore, in the description of the present embodiment, the same components as those of the first embodiment will be denoted by the same reference numerals as those given in FIGS. 1 to 7 and a detailed description thereof will be omitted.

Figure 8:
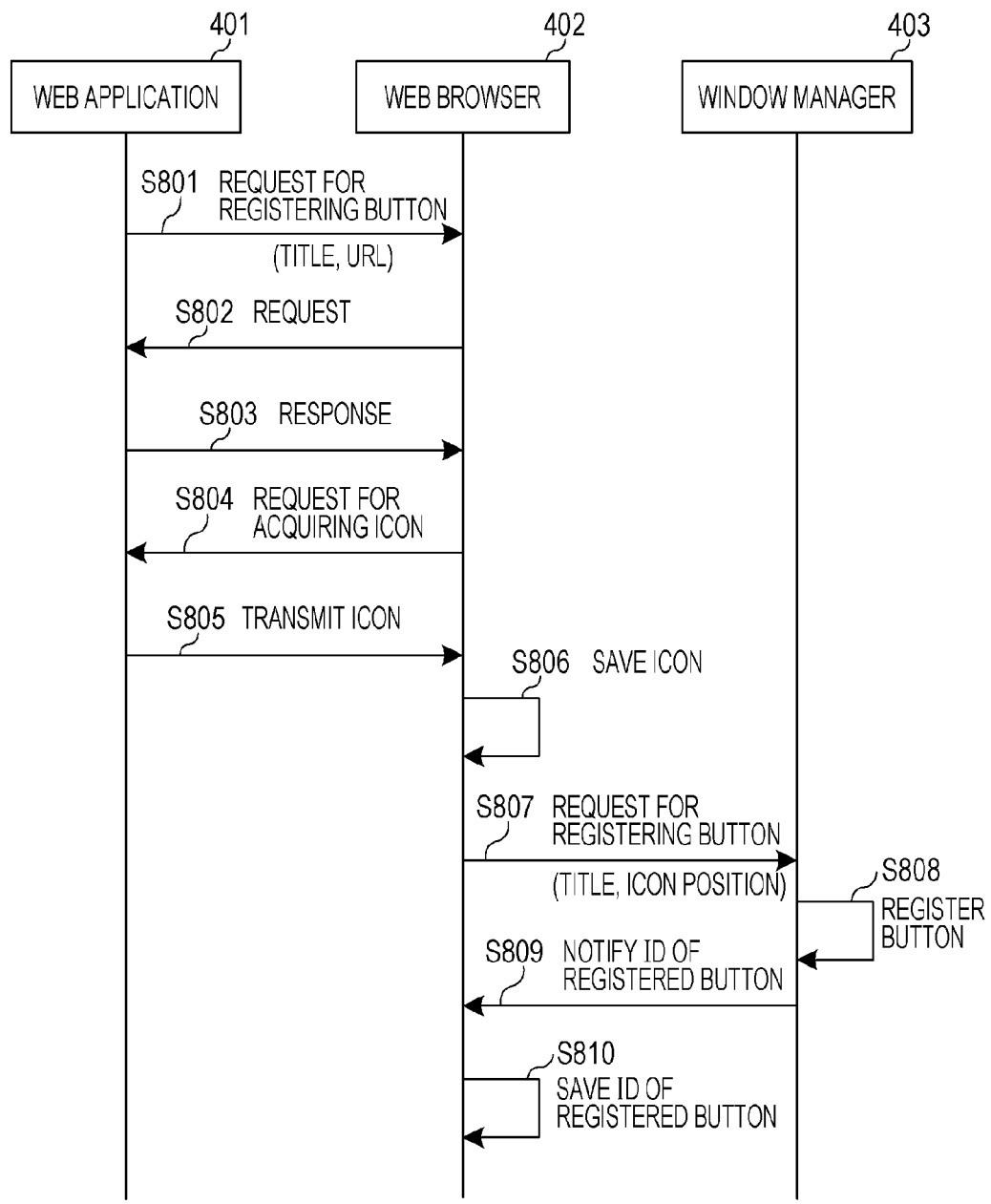
FIG. 8 is a timing chart illustrating a second example of the process of the print system.

FIG. 8 is a timing chart illustrating an example of a series of process steps in a print system at the time of changing icons of the web top buttons. Each operation of the timing chart illustrated in FIG. 8 is implemented, for example, by the CPU 201 of the MFP 101 executing a control program. In step S801, the web application 401 makes a button registration request to the web browser 402. Here, the button setting unit 413 of the web application 401 makes the button registration request to the button creation unit 423 of the web browser 402. At this time, the button setting unit 413 designates a title to be displayed on the button and an access URL to the web application 401 to which the button setting unit 413 belongs.

In step S802, the web browser 402 accesses the web application 401 in accordance with the access URL designated by the button setting unit 413 of the web application 401. The content acquisition unit 420 of the web browser 402 makes a GET request to the access URL designated by the button setting unit 413 of the web application 401. In step S803, the content transmitting unit 412 of the web application 401 transmits a response message to the web browser 402. At this time, the web application 401 includes icon position information that the web application 401 has in the response message.

Icon position information may be described in a format previously determined between the web application 401 and the web browser 402 or may be a format in the HTML/XHTML called "Favicon." An example of designation of the icon position information when "Favicon" is employed is:
<link rel="shortcut icon" href="http://localhost/service_A/favicon.ico" type="image/vnd.microsoft.icon"/>

In step S804, the web browser 402 makes a request for acquiring an icon to the address represented by the icon position information acquired in step S803. Since the web application 401 has the icon itself, the web browser 402 makes a GET request to the web application 401. In step S805, the web application 401 transmits the icon requested from the web browser 402 to the web browser 402. In step S806, the web browser 402 stores the icon acquired in step S805 as an own address data in the address data storage unit 424.

In step S807, the web browser 402 makes a button registration request to the window manager 403 in accordance with the registration request of the web top button in step S801 and with the information about the icon acquired in step S805. At this time, the button creation unit 423 designates the "title displayed on the button" received in step S801 and the position information about the "icon" stored in step S806 to the button registration unit 430 of the window manager 403. In step S808, the button registration unit 430 of the window manager 403 registers the button designated in step S807. The button registration unit 430 creates an ID for identifying the registered button and stores, as button data 431, the type of the application for which the registration request has been made and the icon position information in the button in a correlated manner. The button drawing unit 432 displays the registered button on the application selection screen (i.e., the main menu screen) together with the icon button.

With the processes described above, the icons on the web top buttons 721 and 722 are changed as the web top buttons 721 and 722 illustrated in FIG. 7. In step S809, the window manager 403 notifies the web browser 402 of an "ID for identifying button" created in step S808. In step S810, the web browser 402 performs subsequent processes. The web browser 402 stores the "ID for identifying button" received from the window manager 403 as address data in the address data storage unit 424 together with the access URL of the web application 401 requested in step S801. In this manner, the information about the web application 401, the information about the button, and the information about the icon are stored as the address data in a correlated manner. The present embodiment provides the same effect as that described in the first embodiment.

A third exemplary embodiment of the present invention will now be described. In the present embodiment, a web application 401 changes an icon of a web top button in response to the changes in states of an external service 441. The present embodiment differs from the previously described embodiments in the process to display the web top button and its icon. In the description of the present embodiment, the same components as those of the first and second embodiments will be denoted by the same reference numerals as those given in FIGS. 1 to 8, and a detailed description thereof will be omitted.

Figure 9:
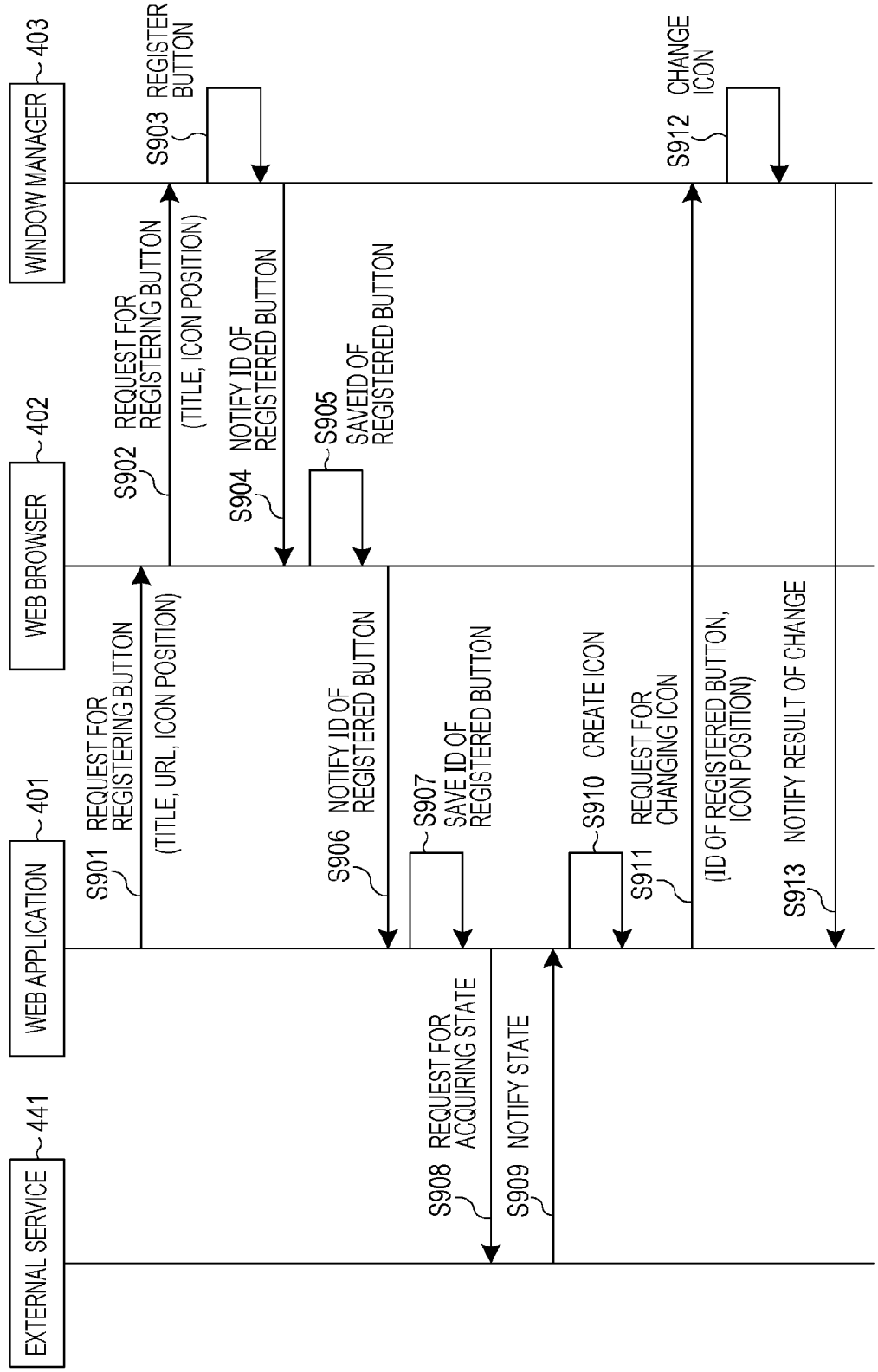
FIG. 9 is a timing chart illustrating a third example of the process of the print system.

FIG. 9 is a timing chart illustrating an example of a series of process steps in a print system at the time of changing icons of the web top buttons. Each operation of the timing chart illustrated in FIG. 9 is implemented by, for example, a CPU 201 of an MFP 101 and a CPU 301 of an external server 104 executing each own control program. Since processes of steps S901 to S905 are equivalent to steps S601 to S605 in the first embodiment, detailed description thereof will be omitted.

In step S906, a web browser 402 notifies the web application 401 of an "ID for identifying button" notified in step S904. In step S907, the web application 401 stores the "ID for identifying button" notified in step S906. When the ID for identifying button is notified, the button setting unit 413 stores that ID in an icon data storage unit 414 as icon data in a correlated manner with the registration information about the button for which registration was requested in step S901.

In step S908, the web application 401 makes a request to the external server 104 to acquire the state of the external service 441. Here, the external communication unit 410 makes a request to the external service 441 to acquire the state of the external service 441. In step S909, the external service 441 notifies the external communication unit 410 of the external service 441 of the state.

The process of step S908 is periodically performed by the web application 401. The process of step S908 may also be performed at a predetermined timing. When it is determined that the "state of the external service 441" acquired in step S909 has been changed from the last time, a process in Step S910 is processed. The state of the external service 441 changes depending on the content of the external service 441. If the external service 441 is a file management service, as in the example of the present embodiment, it is considered that the state of the external service 441 has been changed when, for example, a new file is registered, a file is deleted, and the content of the file is updated. The change in the state of the external service 441 may be different from those described above.

In step S910, the web application 401 creates an icon that represents that a change in the state of the external service 441 has occurred. Alternatively, the web application 401 selects an icon corresponding to the change in the state of the external service 441 from among multiple icons previously held out of the icons stored in an icon data storage unit 414. In step S911, the web application 401 makes a request to the window manager 403 to change the icon for the web top button which has already been registered. At this time, the button setting unit 413 of the web application 401 notifies the button registration unit 430 of the window manager 403 of the "ID for identifying button" stored in step 907 and the position information about the "icon" created in step 910.

Figure 10:
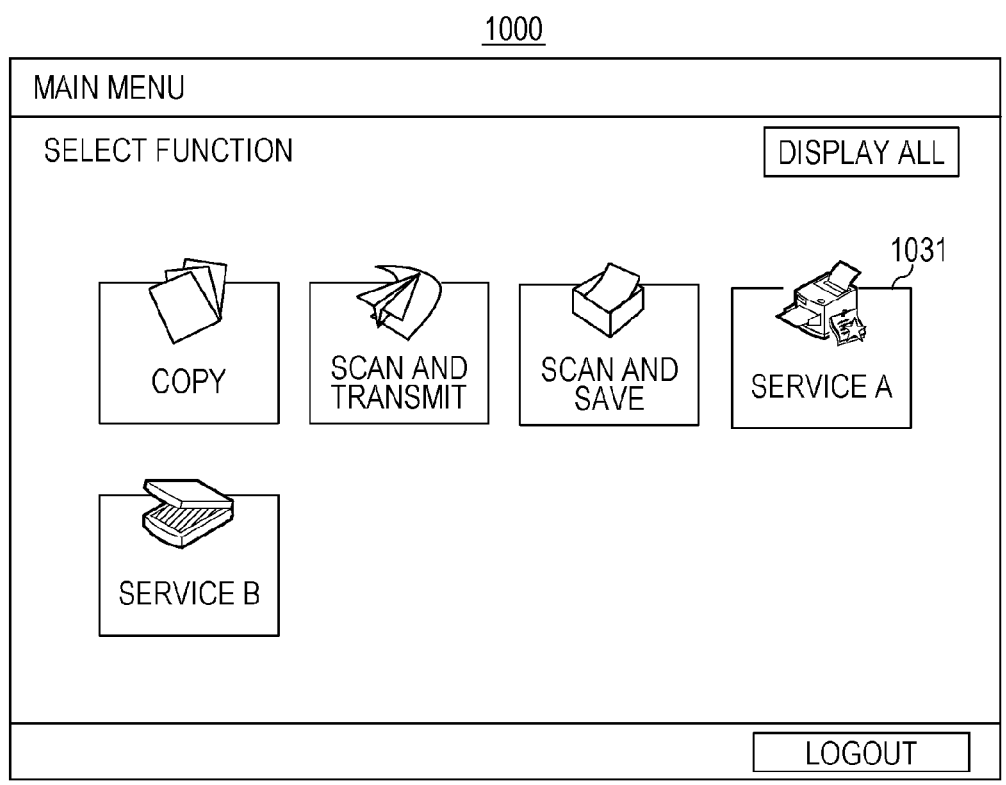
FIG. 10 illustrates a second example of the application selection screen.

In step S912, the button registration unit 430 of the window manager 403 specifies the web top button created in step S903 in accordance with the ID for identifying button. The button registration unit 430 then changes the icon currently displayed on the web top button to an icon in the address in accordance with the position information notified in step S911. FIG. 10 illustrates an example of an application selection screen (i.e., a main menu screen) after the icon is changed in step S912. An icon of a button 1031 of an application selection screen 1000 has been changed to an icon to which a picture representing that a file is newly registered in the file management service is added. This allows the user to recognize the change in the state of the external service 441 without any special manipulation.

In step S913, the button registration unit 430 of the window manager 403 notifies the button setting unit 413 of the web application 401 that the icon has been changed. The icon of the web top button in an MFP 101 is changed by the change in the state of the external service 441. This allows the user to recognize the state in the external service which is being used without any special manipulation and before pressing the web top button. As a result, operability of the application using the service of the external server is increased. The present embodiment is applicable to the second embodiment. In that case, the processes and step S908 and thereafter illustrated in FIG. 9 are performed after, for example, the process in step S810 illustrated in FIG. 8.

Process of Web Browser 402

Figure 11:
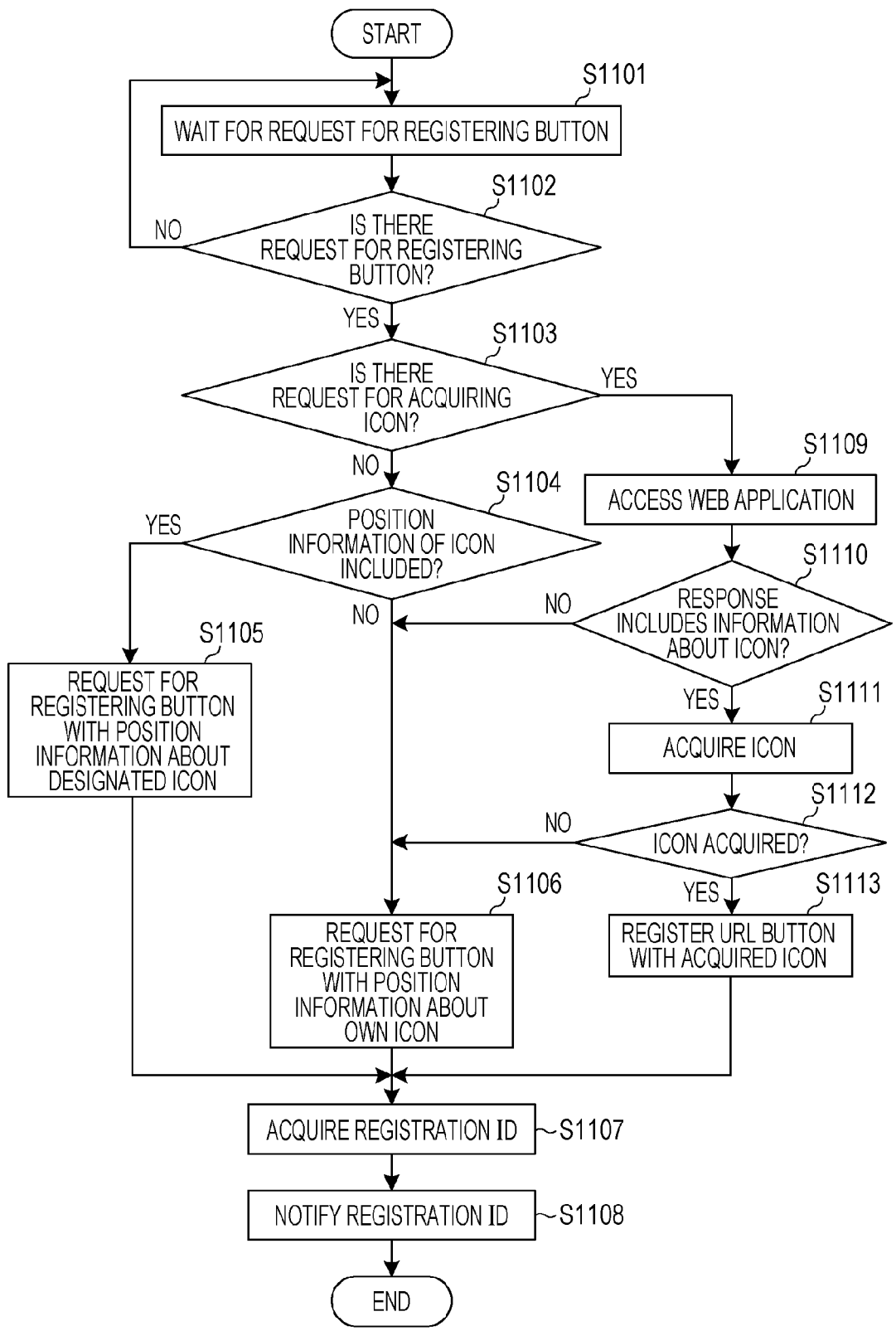
FIG. 11 is a flowchart illustrating a process of a web browser.

FIG. 11 is a flowchart illustrating an example of a series of process steps in the web browser 402 of each of the above-described embodiments. Each operation in the flowchart of FIG. 11 is implemented when, for example, the CPU 201 of the MFP 101 executes a control program. First, in step S1101, the web browser 402 waits for a registration request of the web top button from the web application 401. In step S1102, the web browser 402 determines whether the button creation unit 423 has received the registration request of the web top button from the button setting unit 413 of the web application 401. When it is determined in step S1102 that no registration instruction of the web top button has been received, the process returns to step S1101. When it is determined in step S1102 that, on the other hand, that registration request of the web top button has been received, the process proceeds to step S1103. When the process proceeds to step S1103, the web browser 402 determines whether a request for acquiring an icon from the web application 401 is included in the registration request of the web top button. This request is designated in the registration request of the web top button to the button setting unit 413 from the button creation unit 423. Alternatively, the web browser 402 may make this determination with reference to a value previously stored as a setting value of the web browser 402 in the address data storage unit 424.

If it is determined in step S1103 that a request for acquiring an icon is included in the registration request of the web top button, the process proceeds to step S1109 described below. If, on the other hand, no request for acquiring an icon is included in the registration request of the web top button, the process proceeds to step S1104. In step S1104, the button creation unit 423 determines whether icon position information is included in the registration request of the web top button. If it is determined in step S1104 that the icon position information is included in the registration request of the web top button, the process proceeds to step S1105. In step S1105, the button creation unit 423 makes a request for registration of the web top button to the button registration unit 430 together with the icon position information. Then the process proceeds to step S1107 described below.

If it is determined in step S1104 that no icon position information is included in the registration request of the web top button, the process proceeds to step S1106. In step S1106, the button creation unit 423 makes a request for registration of the web top button to the button registration unit 430 together with the "icon position information of the web browser 402 itself" included in the address data storage unit 424. Then the process proceeds to step S1107. In step S1107, the button creation unit 423 acquires an ID of the registered web top button (i.e., a registration ID) from the button registration unit 430. In step S1108, the button creation unit 423 notifies the button setting unit 413 of the web application 401 for which the registration request of the web top button has been made in step S1102 of the registration ID acquired in step S1107.

If it is determined in step S1103 that no instruction for acquiring an icon is included in the registration request of the web top button, the process proceeds to step S1109. In step S1109, the content acquisition unit 420 accesses the designated URL (i.e., the web application 401). The content acquisition unit 420 makes a GET request to the designated URL, and acquires the response thereof. In step S1110, the content analysis section 421 determines whether the icon position information is included in the web content received as a response. In particular, for example, it is determined whether description of "Favicon" described in step S803 of FIG. 8 is included in the web content received as a response. If it is determined in step S1110 that no icon position information is included in the web content received as a response, the process of step S1106 described above is performed.

If, on the other hand, it is determined in step S1110 that icon position information is included in the web content received as a response, the process proceeds to step S1111. In step S1111, the content acquisition unit 420 acquires an icon in accordance with the icon position information. The content acquisition unit 420 transmits a request for acquisition of the icon to the URL represented by the icon position information, and acquires the icon as a response. In step S1112, the content analysis section 421 determines whether the icon has been correctly acquired. The content analysis section 421 determines whether the size and the format of the icon data are suited for the display by the window manager 403 in addition to whether the icon data have been correctly received as a response. If it is determined that the icon data has not been correctly acquired, the process of step S1106 described above is performed.

If, on the other hand, it is determined in step S1112 that the icon data has been correctly acquired, the process proceeds to step S1113. In step S1113, the button creation unit 423 stores the icon data acquired in step S1111 in the address data storage unit 424, and makes a request for registration of the web top button to the button registration unit 430 together with the icon position information. Then, the processes of step S1107 and thereafter described above are performed.

In addition to or in alternative to the state of the external server 104, the icon may be changed in accordance with at least one of the state of the web application 401 and the state of the MFP 101. An example of a case in which the icon needs to be changed in accordance with the state of the web application 401 is a case in which setting of the side of the web application 401 is required after the install of the web application 401 in the MFP 101. In this case, the web application 401 creates an icon which corresponds to that after the installation. The web application 401 then makes a request to the window manager 403 to change the icon of the web application 401 to a predetermined icon which is to be recognized by the user. After the setting of the web application 401 is completed, the icon which corresponds to that after the installation is changed to an icon which represents that the web application 401 is available.

An example of a case in which the icon needs to be changed in accordance with the state of the MFP 101 is a case in which the display language of the title of the web top button has been switched. In this case, the web application 401 monitors switching of the display language of the title of the web top button in MFP 101. When the display language is switched, the web application 401 creates an icon in accordance with the display language. The web application 401 makes a request to the window manager 403 to change the icon of the web application 401 from the web application 401 to an icon in accordance with the display language. At this time, it is possible to change the icon to that in accordance with the display language only about the icon which includes predetermined information, such as characters.

Note that the embodiments described above are merely examples of embodiments to implement the present invention, and the technical scope of the present invention should not be restrictively interpreted. That is, the present invention can be implemented in various forms without deviating from the technical idea or the principle features thereof.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-253200 filed Nov. 11, 2010, which is hereby incorporated by reference herein in its entirety.

What is claimed is:

1. An information processing device comprising:
a web browser unit which displays content;
an application unit which communicates with an external device and receives information about the content, and then provides the content in accordance with the provided information to the web browser unit; and
a window manager which controls display of a button that is selected by a user in order that the web browser unit makes a request to the application unit for the content and displays the content on a screen and controls an icon which is in accordance with the application unit,
wherein the application unit transmits, to the web browser unit, a location at which the icon in accordance with the application unit is stored, a URL for accessing the application unit, and a title corresponding to the application unit,
wherein the web browser unit requests registration of the button corresponding to the application unit by transmitting the location at which the icon is stored and the title to the window manager, and then stores button identification information which is provided by the window manager upon registration of the button in the window manager and the URL in a correlated manner,
wherein after the registration of the button corresponding to the application unit, the window manager displays the icon corresponding to the application unit and the title on an application selection screen together with the registered button, and
wherein the web browser unit receives button identification information provided upon selection of the button on the application selection screen, and accesses the application unit in accordance with the URL in association with the button identification information and receives the content.

2. The information processing device according to claim 1, wherein
the application unit monitors a state of the external device,
wherein upon detection of a change in the state of the external device, the application unit creates an icon in accordance with the change in the state, and
wherein the web browser unit requests the window manager to change the icon corresponding to the application unit in accordance with the button identification information provided to the window manager.

3. A method for processing and controlling information, wherein:
a web browser unit displays content information;
an application unit communicates with an external device and receives information about the content, and then provides the content in accordance with the provided information to the web browser unit;
a window manager controls display of a button which is selected by a user in order that the web browser unit makes a request to the application unit for a screen of information of the content and lets the content be displayed on a screen and controls an icon which is in accordance with the application unit and which lets the user to identify the button;
the application unit transmits, to the web browser unit, a location at which the icon in accordance with the application unit is stored, a URL for accessing the application unit and a title corresponding to the application unit;
the web browser unit makes a request for registration of the button corresponding to the application unit by transmitting the location at which the icon is stored and the title to the window manager, and then stores button identification information and the URL notified upon registration the button in the window manager in a correlated manner;
after the registration of the button corresponding to the application unit, the window manager lets the icon corresponding to the application unit and the title be displayed on an application selection screen together with the registered button; and
the web browser unit receives button identification information notified upon selection of the button on the application selection screen, and accesses the application unit in accordance with the URL in association with the button identification information.

4. A computer-readable storage medium that stores a program enabling a computer to execute the method according to claim 3.

* * * * *